United States Patent Office 3,528,860
Patented Sept. 15, 1970

3,528,860
**SURFACE COATING COMPOSITIONS
AND THEIR USE**
Max Kronstein, New York, N.Y., assignor to Oakite
Products, Inc., Berkeley Heights, N.J., a corporation
of New York
No Drawing. Continuation-in-part of application Ser. No.
362,931, Apr. 27, 1964. This application Oct. 4, 1967,
Ser. No. 672,714
Int. Cl. C23f 7/08
U.S. Cl. 148—6.15          31 Claims

ABSTRACT OF THE DISCLOSURE

A film forming wash-primer composition containing (1) finely divided discrete particles of molybdenum trioxide or polyvalent metal molybdate (2) an aqueous dispersion of a stably water-dispersible film-forming resin capable of undergoing cross-linking and (3) a water soluble acidic phosphate-ion-providing compound; which forms a corrosion resistant coating on clean metal to which a finish coating may be applied.

---

This application is a continuation-in-part of my copending application Ser. No. 362,931 filed Apr. 27, 1964, now abandoned.

This invention is a novel class of so-called "wash-primer" compositions and, more particularly, is concerned with acidic aqueous film-forming-resin-containing compositions including a molybdate-radical-providing compound, which compositions, when applied to a metal surface, not only react with the metal surface to form thereon an adherent, complex surface coating comprising certain metal components from active ingredients of treating the composition as well as the metal constituents of the metal surface.

The wash-primer compositions of this invention contain the sparingly soluble in water molybdate-radical-yielding inorganic compound (hereinafter for convenience sometimes called the reactive molybdate pigment) dispersed as insoluble finely divided discrete particles in an aqueous vehicle wherein there is stably dispersed also at least one film-forming resin dispersible in water. These aqueous compositions also contain dissolved in them at least one water-soluble substance capable of providing phosphate ions thereby to impart acidity (pH below 7) to them.

The invention includes also the method of preparing the foregoing compositions embraced by it.

A further part of the invention is the method of enhancing corrosion resistance by providing on a metal surface an adherent corrosion resistant complex conversion coating containing the principal metal of the treated surface together with phosphorus and molybdenum, as well as the cation of the sparingly soluble in water molybdate-radical-yielding compound from the aqueous composition, and all integrally involved with a covering coating of the film-forming polymeric materials.

That method comprises applying over the metal surface an aqueous wash-primer coating composition of the invention. As the coating thereafter is in contact with the metal surface and subsequently is dried and undergoes setting, there occurs an interreaction involving the film-forming polymer, the molybdate anion, the phosphate anion, and the metal surface, resulting in the formation thereon of a complex, adherent, corrosion resistant coating.

Heretofore it was known that when a dispersion of a pigment such as zinc oxychromate in a solution of a resin in an organic solvent, such as a mixture of propyl and butyl alcohols, and containing a phosphate, was applied over a metal, e.g. steel, it formed a coating reaction product on the metal surface. These coating dispersions, hereinafter generally called "wash-primers" for convenience only, form adherent corrosion resistant coatings on metal surfaces.

However, a different wash-primer found in the development leading to this invention used only a polyvinyl butyral resin dissolved in a mixture of the organic solvents propyl and butyl alcohols. It was a serious disadvantage that this prior wash-primer depended heavily on the use of these inflammable, organic solvents.

One great advantage of the aqueous or water-based wash-primers of this invention is that these reactive compositions can, if desired, be applied directly onto metal surfaces such as ferrous (steel) surfaces under circumstances and conditions where no facilities are available for a classic industrial phosphatizing process, and also in instances where the metal parts are of a size unsuitable and not readily adaptable for such treatment.

Another advantage is that these aqueous wash-primers, especially because of their containing only one organic component, i.e. the film-forming resin, can be applied to result in thin films which are chemically interreacted with metal surfaces, and enable other, such as finish, coating systems to be applied over them. On the other hand, it is also possible to provide by the water-based wash-primers of this invention, heavier reaction coating layers than could be accomplished with the previously known organic solvent types of wash-primers.

A further feature of these aqueous based wash-primers of the invention is that they can be stored as final compositions in the complete form in which they are to be used in their application. This is in contrast to the organic solvent based wash-primers of the other part of the investigation resulting in this invention, which need to be used as two-phase primers; that is to say, two different complementing mixtures had to be prepared and stored separately, and the acid phase could only be added to the resin solution immediately prior to actual application.

Finally, since these water based wash-primers are not derived in any way from a solution in an organic solvent vehicle, subsequent applications of other coatings can have no noticeable ill effect in the dried water-based primer coating even when the subsequent coatings contain organic solvents.

The degree of extent of the complex or reaction conversion product formation and analysis of the complex conversion coating for its pertinent constituent elements can be accomplished by adequately cleaning away and removing the chemically unreacted part of the applied primer coating, then stripping off the complex surface reaction conversion coating by an acidic stripping agent from the thus uncovered metal surface, with drying and weighing before and after stripping to enable calculating the coating weight per unit area; and analyzing the resulting stripping solution by an emission spectrometer for content of the individual components of the thus stripped complex surface reaction coating; all by procedures described in "Methods for Investigating the Characteristics of Reactive Coatings" in the October 1959 issue of "Corrosion" pp. 18–22 (at p. 18 col. 2 to p. 19 col. 2), and "Studying Organic Coatings," in "Paint and Varnish Production," vol. 49, No. 1 (January 1959).

In case the reaction after a single application of any of these wash-primers does not produce a heavy enough conversion coating weight to enable attaining satisfactory analysis accuracy, the base metal can be given two separate, superposed applications of the same "wash-primer" composition, each being followed by the washing away and removal of the chemically unreacted part of the applied coating; and a third such application followed by similar removal of the unreacted part of the coating can be made thereafter if deemed necessary.

However, when the reaction from the application or applications of such reactive composition on the surface of the metal has produced a very dense complex reaction coating, no further interreaction will occur between any subsequent application of such composition and the underlying metal surface.

The film-forming polymeric materials which may be used in preparing the dispersions in these improved wash-primers, should include at least one reactive polymer which is capable of undergoing cross-linking or of significantly increasing its volume in the presence of water. The polymeric material should further be capable of being stably dispersed in an aqueous medium.

One class of polymeric materials which can be used is the polymer latices, typical examples being polyvinyl acetate latex, polyacrylic acid latex, styrene butadiene latex, and butyl rubber latex. All of these latices provide relatively stable water dispersions. Polymeric alcohols, which include the polyvinyl alcohols, comprise another useful classs.

Cellulose derivatives have also proved to be valuable. Examples of those which can be used are the methyl celluloses, ethyl cellulose, hydroxyethyl cellulose, ethoxycellulose. Other polymeric materials which have usefulness include various copolymers of methyl vinyl ether and maleic anhydride, and polyvinyl pyrrolidone. Any of the foregoing classes and individual polymers can be used advantageously as mixtures of any two or more of them.

As presently indicated, among the most effective of these polymeric materials, has been found the polyvinyl alcohols used alone or along with any of the latices and especially with the styrene-butadiene latices, polyvinyl acetate latices, polyacrylic acid latices; and also methyl cellulose either used alone or along with other polymers. Also particularly effective is the copolymer of methyl vinyl ether and maleic anhydride either alone or along with the various latices.

It has been found that if it is desired that these wash-primer applications should provide a heavier conversion coating thickness, the use of a polyvinyl alcohol along with a latex, or of the coploymer of methyl vinyl ether and maleic anhydride with a latex, will produce conversion coatings of greater film thickness, and that these coatings also can serve as a base or primer coat to be covered by other coating systems.

If combinations of polymer latices are used, the dispersions should not be allowed to freeze, nor should they be heated at temperatures sufficient to cause cross-linking or other interreaction of the latices. Otherwise, the storage stability of the wash-primer compositions will be adversely affected.

No fixed general range can be selected for the concentration of the film-forming resin in the various wash-primer compositions of the invention, since the specific amount required in individual instances is influenced by the ultimate general characteristics of the final coating required. The particular concentration needed readily can be determined by available easy and brief tests within the judgment of a worker of ordinary skill in this involved coating art. However, it is important that the film-forming resin be present in a concentration at least sufficient to provide an adequately adherent continuous film after the application of the wash-primer composition is dry after evaporation of its aqueous vehicle.

A second essential component of these water based wash-primers is the sparingly soluble in water inorganic molybdate-radical-yielding compound which is included in the aqueous composition to such extent as to be present as finely divided discrete particles much as if it were a pigment. The particular molybdate compound which is employed in the dispersion has been found not to be critical. Broadly, the molybdates prepared with the metals of the following groups of the Periodic Table are useful in the compositions of this invention, Group I-B: copper and silver, Group II-A: calcium, strontium, and barium, Group II-B: zinc, cadmium, and magnesium, Group III-B: aluminum, Group IV-A: zirconium, Group VI-A: chromium, Group VII-A: manganese, and Group VIII: iron, cobalt, and nickel.

Such molybdates as zinc molybdate, copper molybdate, cobalt molybdate, silver molybdate, strontium molybdate, nickel molybdate, cadmium molybdate, iron molybdate, lead molybdate and calcium molybdate, and mixtures of any of these gave satisfactory coatings. Molybdic acid anhydride (i.e. molybdenum trioxide, $MoO_3$) also can be used. As far as presently indicated zinc molybdate is of particular usefulness for preparation of the wash-primer dispersions. It has been found also that the mixtures of zinc molybdate and copper molybdate are very effective, as they provide enhanced conversion coating weights over the equivalent amount of each alone. The applicable molybdate-radical-yielding compounds, such as the foregoing polyvalent metal molybdates and molybdenum trioxide are at most sparingly soluble in water.

Since ingredients of the wash-primer compositions interreact with the metal surfaces to which they are applied, differences in the coatings are obtained, for example, when a single molybdate, such as zinc molybdate is used alone, from what occurs when a mixture, such as that of zinc molybdate and copper molybdate, is used.

The insoluble molybdates for use in the compositions of the invention are produced readily by well known inorganic synthesis. For example, a highly water-soluble molybdate such as sodium molybdate and an approximately molar equivalent amount of the desired metal cation as a soluble salt, for instance copper chloride, are dissolved in water and the resulting practicaly water-insoluble copper molybdate precipitates. The precipitated molybdate salt is separated, washed and dried.

Ordinarily, the molybdates used in the compositions of the invention are not seriously affected by residual water-soluble impurities of their preparation. Among those which may be present but which have been found to have little or no adverse effect are sodium molybdate, and the chlorides of sodium, potassium, and ammonia. It has been found desirable, however, to keep the concentration level of sodium molybdate very low, such as about 0.01%. Thus, purification steps are generaly unnecessary, but can be used if desired.

No specific range need be given for the particle size of the finely divided molybdate-radical-yielding compound. Its specific particle size may be influenced by the end characteristics contemplated for the resulting dried complex conversion coating provided by the film-forming acidic reactive composition, as well as by the ultimate surface finish appearance after applying any planned finish coat over the dried "wash-primer" coating. If a highly smooth final surface is desired, a person with ordinary skill in the art would be able to judge about what range of partical size to use. However, if a coarser final finish is desired, a correspondingly larger particle size of the finely divided pigment would be used.

Finally, a water-soluble source of phosphate ions is a further necessary constituent of these wash-primer compositions. This source can be phosphoric acid, the alkali metal dihydrogen phosphates such as sodium dihydrogen phosphate, potassium dihydrogen phosphate, ammonium dihydrogen phosphate, and certain organic phosphates such as methyl acid phosphate and aluminum organic phosphate, as well as mixtures of any of these. It has been found that for control of the acidity of the composition, it is beneficial to employ a mixture of phosphoric acid and alkali metal dihydrogen phosphates, particularly, sodium dihydrogen phosphate. For example, a one to one weight ratio of phosphoric acid to sodium dihydrogen-phosphate has been found particularly effective to give superior storage properties to the compositions, although the usefulness of the invention is in no way limited to this combination or ratio.

Although mixtures of the various phosphates can be employed, at least a part of the phosphate should be from an inorganic source, although this is not critical. In using the organic phosphates, however, their concentrations should be controlled to avoid formation of a two layer system, as that might reduce some of the advantages available from the invention.

It has been found that the dispersion compositions of the invention should be acidic to function suitably. Generally, their pH should not be below about 3.0 to 3.5, and there is no maximum pH except for the mixture to be acidic. In the compositions containing the individual types of water-based polymers, it has been found beneficial that a pH value of about 3 to about 4 be used with the polyvinyl alcohols. When cellulose derivatives such as ethyl cellulose and the like are used, the pH is best kept in the range of about 5 and under 7. With the polymer latices, such as butyl rubber latex and the like, it is better to maintain the pH of the dispersion in a range between about 6 and under 7.

It is beneficial, although not absolutely essential, to include a relatively small amount of a suspender or thickener in these water-based wash-primer dispersions. Typical examples of such thickneners or suspending agents are bentonite clays, finely divided attapulgite clay, and the like. Other finely divided colored pigments may be added, if desired. The presence of these materials improve the storage characteristics of the dispersions and prevent settling of the molybdates as well as coalescing of the dispersed film-forming polymers.

Certain other compounds advantageously may be added to these wash-primers. For example, one of them is a peroxide, beneficially the inorganic peroxide, hydrogen peroxide. Used in the primer, at least in somewhat limited amounts, it appears to increase the interreaction between the wash-primer and the steel surface. It has been found, for example, that a concentration of about two percent of 30% hydrogen peroxide, based on the weight of wash-primer, gives a favorable effect. However, substantially larger concentrations have an adverse effect in that the peroxide appears to continue reacting in the primer composition and thereby to decrease its interreaction with the metal surface.

Addition of a small amount of a water-soluble nitrate or aqueous soultion of it, such as sodium nitrate, potassium nitrate, and the like, increases the stripping weight of the conversion coating on the metal surface. About 1.5 to 2 weight percent of a 25% aqueous solution was found to increase the stripping weight, but addition of larger amounts appears to have no further effect.

Other materials whether water-soluble or insoluble may be added to these water-based wash-primer compositions without departing from the spirit of the invention. However, some precaution should be observed to avoid using any such additions which would reduce the effectiveness of the resulting conversion coatings and the advantages obtainable from them.

As a typical embodiment of the invention, zinc molybdate as the reactive molybdate pigment is incorporated into a water-based dispersing medium such as a latex emulsion as that of polyvinyl acetate of about 50–60% solids. Water may be added if desired as a diluent, or water to which has been added, for instance, a water-dispersible, film-reinforcing resin and beneficially some thickening agent, e.g. magnesium silicate clay. The pigmentation may be influenced further by addition of coloring agents such as lampblack, and the like. This water-based wash-primer then is completed by adding to it an aqueous sodium dihydrogen phosphate solution as its activator constituent.

This primer "paint" or wash-primer was then coated onto SAE 1010 steel testing panels, and dried with warm air. The unreacted part of this primer paint film was removed by solvent, and the surface reaction or conversion coating uncovered, and then stripped off. The wash-primer was found to have formed very adherent, corrosion resistant conversion coatings on the test panels. Tests indicated an interreaction had taken place between the surface of the steel panel and the components of the wash-primer.

The above described methods for obtaining film-forming coatings on metal surfaces may be applied to a metal ordinarily subject to oxidation corrosion when exposed to an oxidation-corrosion-inducing atmosphere, and advantageously to ferrous metals and their alloys but is in no way limited thereto. Such reactive coatings also can be applied to non-ferrous metal surfaces such as aluminum, magnesium, zinc, cadmium, and alloys of them.

These dispersions can also be applied to surfaces other than metal such as wood, glass and other ceramic materials although in these instances there probably is no interreaction between the coatings and the surfaces to which they are applied.

The reactive compositions of the invention can be applied to the surfaces to be treated by immersion in the composition, or by brushing, spraying or otherwise applying the compositions to the surfaces, even by means of rollers or sponges. These various methods of application can be referred to broadly by speaking of applying the composition over the surface of the metal or other material to be treated.

Salt spray tests have shown that metal surfaces provided with the adherent film complex conversion coating, by application of the water-based wash-primer composition of this invention, exhibit significantly high corrosion resistance. These good effects are shown even after removal of the resin film (by solvent) leaving deposited on the metal surface only the integral complex conversion coating.

The various aspects of the invention may be illustrated by, but not restricted to, the following examples.

Example 1.—Zinc molybdate, polyvinyl acetate, sodium dihydrogen phosphate 96.4 grams of zinc molybdate were dispersed in 100 grams of the polyvinyl acetate latex known commercially as Du Pont's Elvacet 81–90 (having 55% solids), and 300 grams of water were added as diluent. This dispersion can be modified, if desired, by adding other reactive or unreactive components such as 14.3 grams of magnesium silicate and other color tinting agents such as lampblack. An organic thickening agent can be added, such as methyl cellulose or other water-soluble cellulose derivative thus contributing at the same time to the water-based dispersing medium. For example, 12 grams of methyl cellulose in water solution can be added to 100 grams of the latex dispersion earlier above prepared.

The foregoing pigmented dispersion was activated to a finished water-based wash-primer by addition of 25 parts of a 10% aqueous sodium dihydrogen phosphate solution to 100 parts of the dispersion. Application of this wash-primer to SAE 1010 steel panels or other metal surfaces was by means of immersion, brushing or spraying.

The effectiveness of the reaction coating was tested by removing (by solution) the unreacted primer "paint" thereby to uncover the surface reaction or conversion coating. This latter was stripped (as explained in the last paragraph of page 3 above) and found to weigh 35.11 mg. per sq. ft. of metal surface. Its composition as to the four most pertinent elements, found for 100 mg. of stripped coating, was:

| | Mg. |
|---|---|
| Iron | 46.79 |
| Zinc | 11.45 |
| Phosphorus | 7.93 |
| Molybdenum | 2.41 |

Ratio of zinc to phosphorus is 100 to 21.06. Such high percentages of zinc and molybdenum in the surface complex reaction coating demonstrates that the applied acidic reactive wash-primer of the invention reacted chemically with the metal surface to form a reaction complex conversion coating which gave the surface a completely new and different chemical constitution.

The process of the foregoing example can be repeated by using instead of its zinc molybdate equivalent weights of cobalt molybdate, copper molybdate, cadmium molybdate, or nickel molybdate respectively, and with correspondingly like results.

In a similar experiment 200 g. water, 24.1 g. zinc molybdate, 0.25 g. lampblack pigment, 3.6 g. of magnesium silicate clay, and 25 g. of polyvinyl acetate latex were mixed together, and the resulting dispersion was admixed with a 10% water solution of sodium dihydrogen phosphate containing 6.25 g. of the phosphate. The resulting wash-primer conversion coating showed similar good results to those of the above example, with the stripped film weighing 35.11 mg. per sq. ft.

Example 2.—Zinc molybdate, polyacrylic acid latex, sodium dihydrogen phosphate

A mixture of 200 g. water, 24.1 g. zinc molybdate, 25 g. commercial (Dow) polyacrylic acid latex, 3.6 g. magnesium silicate, and 0.27 g. lampblack pigment were admixed to form the reactive molybdate dispersion which then was activated with 62.5 g. of a 10% aqueous solution of sodium dihydrogen phosphate.

After four consecutively separate applications to SAE 1010 steel panels with the unreacted primer "paint" washed off after each application and before applying the next, the stripping weight was found to be 31.76 mg. per sq. ft.

Example 3.—Zinc molybdate, polyacrylic acid latex and methyl cellulose, sodium dihydrogen phosphate A dispersion was prepared in 200 parts waters, with 3.3 parts methyl cellulose (400 cps.), 25 parts polyacrylic acid latex, and 24.1 parts of zinc molybdate. Both hot and cold water were required substantially wholly to dissolve the methyl cellulose. About 50 parts of a 10% aqueous solution of sodium dihydrogen phosphate were admixed therewith as activator. After four applications of this wash-primer, the stripping weight was 42.35 to 42.43 mg. per sq. ft.

Example 4.—Zinc molybdate, polyacrylic acid latex and ethoxycellulose, sodium dihydrogen phosphate A dispersion of 24.1 parts of zinc molybdate in 200 parts of water, of 5 parts ethoxycellulose (commercially known as Union Carbide WP–40), 25 parts polyacrylic acid latex, and 4 parts of the wetting agent known commercially as Tamol 731 in 25% aqueous solution was mixed with 50 parts of a 10% aqueous solution of sodium dihydrogen phosphate. After four applications to a steel test panel the stripping weight of the coating was found to be 61.2 mg. per sq. ft.

Example 5.—Zinc molybdate, polyvinyl alcohol, sodium dihydrogen phosphate

A dispersion was made up of 24.1 g. zinc molybdate, 3.6 g. magnesium silicate, and 0.25 g. lampblack (as tinting agent) with 25 g. polyvinyl alcohol and 200 g. water, and was activated with 6.25 g. of a 10% aqueous solution of sodium dihydrogen phosphate. After application to the SAE 1010 steel panels, the surface conversion coating was exposed by removal of the unreacted film and stripped, and found to weigh 35.3 mg. per sq. ft.

For a more thickened aqueous vehicle, it is possible to use 20 g. polyvinyl alcohol and 7.5 g. methyl cellulose (4000 cps.).

In another example, 30 g. of molybdic anhydride was mixed with 10 g. of clay, and 25 g. polyvinyl alcohol. This mixture was activated with 37.5 g. phosphoric acid and 37.5 g. of sodium dihydrogen phosphate in 525 g. of water. The dispersion was ball milled for a few hours. When clean steel panels were immersed in this water-based wash-primer composition, a blue color was observed to form in the wash-primer mixture along with the panel as it was gradually lifted by the dip-coater. The panels thereafter were stripped of their conversion coating, and showed a stripping weight of 21.6 mg. per sq. ft.

Polyvinyl alcohol was also used as the film-forming resin in which was dispersed other mloybdates in preparing these water-based wash-primers. In that way it was found that any of zinc molybdate, copper molybdate, silver molybdate, cobalt molybdate, lead molybdate, nickel molybdate, cadmium molybdate, and calcium molybdate, as well as molybdic anhydride can all be used similarly as the source of the molybdate-radical-yielding compound in preparing the wash-primer of the invention.

Example 6.—Zinc molybdate, polyvinyl alcohol, methyl cellulose, sodium dihydrogen phosphate A dispersion was prepared of 24.1 g. zinc molybdate, 200 parts of water, 7.5 parts of methyl cellulose (4000 cps.), 20 parts polyvinyl alcohol, and 25.0 parts of a commercial wetting agent, and activated with 10 parts sodium dihydrogen phosphate added to 50 parts of a 10% aqueous solution of sodium dihydrogen phosphate. When four coatings of this wash-primer composition were applied to magnesium panels, the stripping weight of the complex conversion coating was found to be 69 mg. per sq. ft. Methyl cellulose (400 cps.) was found similarly to replace the one of 4000 cps.

Example 7.—Zinc molybdate, polyvinyl alcohol, hydroxyethyl cellulose, sodium dihydrogen phosphate A dispersion in 200 g. water, of 24.1 g. zinc molybdate, 20 g. polyvinyl alcohol, 5 g. of hydroxyethyl cellulose, 50 g. of a 10% aqueous sodium dihydrogen phosphate solution and an added 10 g. of solid sodium dihydrogen phosphate gave a satisfactory complex conversion coating with exposed resin film surface, when used as a water-based wash-primer application to SAE 1010 steel panels.

Example 8.—Zinc molybdate, polyvinyl alcohol and copolymer of methyl vinyl ether and maleic anhydride, phosphoric acid and sodium dihydrogen phosphate About 25 g. of the copolymer of methyl vinyl ether and maleic anhydride (high viscosity), 50 g. polyvinyl alcohol, 100 g. zinc molybdate, 700 g. water, 75 g. phosphoric acid, 75 g. sodium dihydrogen phosphate, were made into a wash-primer composition as in the other examples. It was found to give satisfactory complex conversion coatings with exposed resin surface, and manifested satisfactory results in the salt fog tests.

Example 9.—Zinc molybdate, hydroxyethyl cellulose, sodium dihydrogen phosphate 15 grams of hydroxyethyl cellulose were dissolved in 250 grams of water at 95° F. 25 grams of zinc molybdate were added, followed by 3.5 grams of magnesium silicate, and 0.25 gram of lampblack pigment. To this mixture there was added 65 grams of a 10% aqueous solution of sodium dihydrogen phosphate as activator. The resulting water-based wash-primer composition was applied to SAE 1010 steel panels. Removal of the unreacted organic film (by solvent) from the metal surface exposed a good, complex reaction conversion coating.

Example 10.—Other cellulose derivatives in water-based wash-primer

The hydroxyethyl cellulose of Example 9 can be replaced in part or as a whole by corresponding amounts of methyl cellulose and/or ethyl cellulose, and the like, and the respectively resulting water-based wash-primers produce comparatively similar complex reaction conversion coatings with outer exposed organic resin film surfaces corresponding to the respective film-forming resin materials used.

Example 11.—Zinc molybdate, methyl cellulose, polyacrylic acid latex, sodium dihydrogen phosphate A dispersion in 200 parts of water, of 3.0 parts methyl cellulose, 24.1 parts zinc molybdate, and 25.0 parts of polyacrylic acid latex, with 5.0 parts of sodium dihydrogen phosphate as a 10% aqueous solution as added activator was applied as a water-based wash-primer on SAE 1010 steel panels. After the exposed unreacted surface resinous film was dissolved away, the then exposed reaction conversion coatings on the panels were stripped off, the stripped coatings were found to weigh 42.35 mg. per sq. ft.

Example 12.—Zinc molybdate, copolymer of methyl vinyl ether and maleic anhydride, phosphoric acid and sodium dihydrogen phosphate A dispersion in 700 g. of water, of 100 g. of zinc molybdate, and 50 g. of a copolymer of methyl vinyl ether and maleic anhydride, commercially known as Gantrez AN-169 with sp. g. of 2.6–3.5 (sp. g. taken as 10% solution in methyl ethyl ketone at 25° C.) with 75 g. of 85% phosphoric acid and 75 g. sodium dihydrogen phosphate then added as activator was prepared as a water-based wash-primer by ball milling for a few hours. The viscous wash-primer composition gave a uniformly heavy coating when applied to metal surfaces.

A less viscous copolymer of the same composition (Gantrez Grade AN-139 with sp. g. of 1–1.4) was used in place of the Gantrez AN-169 in repeating this example. In this case the resulting wash-primer composition was much less viscous and provided a uniform but thinner coating of the surfaces of the panels.

Example 13.—Modification of a polyvinyl alcohol water-based wash-primer by supplementary increase in the organic component as latices A base primer dispersion composed of 78.7 g. water, 37.5 g. polyvinyl alcohol, 15 g. magnesium silicate clay, 60 g. zinc molybdate and 15 g. copper molybdate (i.e. a 4:1 weight ratio of zinc molybdate to copper molybdate), with 56.25 g. phosphoric acid and 56.25 g. sodium dihydrogen phosphate added as activator, was prepared.

One modification of this dispersion was made by admixing 150 g. of a styrene-butadiene 46% latex with 150 g. of the above base primer dispersion. The resulting water-based wash-primer composition was applied onto the surface of the steel test panels and dried for 10 minutes at 125° F. A good reaction coating was formed and the resulting coated panels showed exceptionally satisfactory results in the saltfog test.

Another modification was prepared similarly by admixing 150 g. of a polyvinyl acetate latex with 150 g. of the above base primer dispersion. The resulting water-based wash-primer composition was applied onto steel test panels. A good reaction coating was found after drying for 20 minutes at 125° F.

A third such modification was made by admixing 150 g. of the above base primer dispersion with 50 g. of a polyacrylic acid latex. The resulting water-based wash-primer composition was applied onto and left a good coating on steel test panels after having been subjected to air drying.

A similar base primer dispersion as that described above, except for containing 75 g. of copper molybdate (without any zinc molybdate) was prepared by ball milling for two hours. A modification of this base primer was prepared by mixing 50 g. of the base primer dispersion with 50 g. of water and 200 g. of a polyacrylic acid latex. Coatings were applied on the steel test panels, which then were air dried or dried at 125° F. for 10 minutes. In general, introduction of additional latices into a wash-primer increases the organic component content in the resulting dry wash-primer coating and increases both its density and saltfog resistance.

Example 14.—Modification of a copolymer type water-based wash-primer by supplementary increase in the organic component as latices A dispersion in 700 g. water, of 80 g. zinc molybdate, 20 g. copper molybdate, 10 g. magnesium silicate clay, and 30 g. of the copolymer of methyl vinyl ether and maleic anhydride, with 75 g. phosphoric acid and 75 g. sodium dihydrogen phosphate added as activator, was prepared as a base primer dispersion. 200 g. of this base primer dispersion was admixed with 75 g. of a 46% solids styrene-butadiene latex and 25 g. water. The resulting mixture was coated onto steel panels and oven dried at 150° F. for 5 minutes. The coatings showed satisfactory saltfog test results.

A base primer dispersion was prepared by admixing 700 g. water, 70 g. zinc molybdate, 20 g. copper molybdate, 10 g. cobalt molybdate, and 30 g. of the medium viscosity copolymer between methyl vinyl ether and maleic anhydride, and with 75 g. phosphoric acid and 75 g. sodium dihydrogen phosphate added as activator. To 100 g. of the base primer dispersion was admixed 100 g. of water and then 30 g. of an acrylic acid latex and an additional 30 g. of water. Panels were coated with the resulting water-based wash-primer composition, and both air dried and dried at 125° F. for 15 minutes. The outer unreacted part of the organic film was removable in a solvent, but an adherent reaction conversion coating remained on the thus exposed surface of the panels.

In another modification, 100 g. of this last base primer dispersion were diluted with 100 g. of water. To this diluted dispersion was added 60 g. of a butyl latex and 40 g. of water. A test panel was dipped into this resulting wash-primer composition, and after allowing the coating to dry, and dissolving away the outer unreacted film, the stripped conversion coating weighed 25.3 mg. per sq. ft.

Example 15.—Effect of variations in the molybdate used

Various of the other molybdates have been used to replace part or all of the zinc molybdate in any of the foregoing examples wherein it is used, for example:

Cobalt molybdate has been used and produced outstanding complex conversion coatings embracing also the accompanying resinous exposed film; and, in one instance, the weight of the stripped uncovered conversion coating was 39.4 mg. per sq. ft. Also, test showed the presence of cobalt along with the molybdenum in the conversion coating.

Manganese molybdate has been used and gave effective complex conversion coatings with the integrally associated resinous film.

Nickel molybdate also was used as the molybdate in the water-based wash-primer composition which was found to give good complex conversion coatings with the integrally associated resinous film. After dissolving away the latter, nickel also was detected analytically in the stripped coating whose total weight was 28.78 mg. per sq. ft.

Inclusion of both zinc molybdate and copper molybdate in the water-based wash-primer compositions provided enhanced coatings from them, with exceptionally good results in the saltfog resistance tests. As the zinc molybdate is replaced by copper molybdate, the stripped weight of the conversion coating deposited on the metal panels increased significantly up to about a ratio of 4 of Zn to 6 of Cu. The presence of copper molybdate in a mixed-molybdate composition gave a copper-like appearance to the resulting coatings.

Copper molybdate can also be used as the only molybdate. In a typical example, 700 g. of water, 100 g. copper molybdate, 10 g. magnesium silicate clay, and 30 g. of medium viscosity copolymer of methyl vinyl ether and maleic anhydride were admixed with 75 g. phosphoric acid, 75 g. sodium dihydrogen phosphate added as activator. This water-based wash-primer composition functioned satisfactorily and produced coatings on steel test panels, which showed satisfactory saltfog resistance. Further dilution of the base primer gave somewhat better results and smoother coatings on the test panels.

Example 16.—Zinc and cadmium molybdates, polyvinyl alcohol, methyl vinyl ether and maleic anhydride copolymer, sodium dihydrogen phosphate A dispersion was prepared of 30 g. zinc molybdate, 7.5 g. cadmium molybdate 7.5 g. of magnesium silicate talc, 18.75 g. of polyvinyl alcohol 70–01, and 10 g. of the copolymer of methyl vinyl ether and maleic anhydride (high viscosity) in 393.5 g. of water to which was added 28.13 grams of citric acid and 28.13 g. of sodium dihydrogen phosphate as activator. The resulting water-based wash-primer composition applied to SAE 1010 steel panels after drying provided on them a good resin film covering and integrally associated with a complex conversion coating.

Further modification can be made in any of the various illustrative embodiments. For example, the zinc molybdate of Example 1 was replaced by the corresponding weight of chromium molybdate to provide a water-based wash-primer composition which applied to SAE 1010 steel panels produced on them a satisfactory conversion coating integrally associated with an outer exposed surface resin film.

Similarly, each other of the individual polyvalent metal molybdates listed on page 6 line 20 to page 7 line 3 can replace in whole or part the zinc molybdate of Example 1 or of any other example thereby to provide corresponding water-based wash-primer compositions containing each of them separately as the only molybdate in the final composition, or can replace part of at least one, or all of one, such molybdate in any of the examples containing more than one molybdate. Thereby there are provided respectively corresponding water-based wash-primer compositions containing each of them as the sole molybdate or along with some other molybdate whether it is zinc molybdate or any of the others there listed.

For example, a wash-primer prepared with 30 g. of copper molybdate, 7.5 g. of nickel molybdate, 7.5 g. of magnesium silicate talc, and 18.75 g. of the Archer Daniels Midland Co. alkyd resin "Arolon X 538" in 350 g. of water, with 28.13 g. of sodium dihydrogen phosphate added as activator. SAE 1010 steel panels treated with the resulting water-based wash-primer composition provided a satisfactory coating. The unreacted part of the organic resin film removed by solvent uncovered a good conversion coating which when stripped, showed a weight of 60 mg. per sq. ft.

Example 17.—Zinc molybdate wash-primer with added nitrate

Addition of 10 g. of a 25% aqueous solution of sodium nitrate to the Example 1 water-based wash-primer composition provided from it a modification which applied to SAE 1010 steel panels showed increased weight of stripped exposed conversion complex coating uncovered after removal of the unreacted resin part of the coating. Similar results are obtained by replacing the 10 g. of sodium nitrate solution with other quantities down to about 7.5 g. or by corresponding amounts of a 25% aqueous solution of potassium nitrate.

In the foregoing disclosure and the appended claims, reference to the resin constituent as a reactive resin indicates that upon application of the water-based wash-primer composition to a metal surface to have its corrosion resistance enhanced by such application, the resin constituent reacts, whether by coordination or otherwise, with one or more metal elements contained in the basis metal and/or in metal element-containing constituent of the wash-primer composition.

While the invention has been explained more fully by detailed description of certain specific embodiments of it, it is understood that various modifications and substitutions may be made in them within the scope of the appended claims which are intended to cover also equivalents of the specific embodiments.

I claim:
1. An acidic activated aqueous film-forming-resin-containing wash-primer composition which, upon alone being applied over a clean metal surface lacking prior corrosion resistance enhancement treatment and ordinarily subject to oxidation corrosion, enhances its corrosion resistance by reacting with and giving it a complex conversion coating containing the principal metal content of said basis surface and added molybdenum and phosphorus and integrally covered over with an exposed continuous covering of said film-forming resin; the essential co-acting conversion coating and film-forming constituents of which composition consist essentially of (i) finely divided discrete particles of at least one of molybdenum trioxide and the sparingly soluble in water polyvalent metal molybdates admixed in (ii) an aqueous dispersion of a stably water-dispersible film-forming resin capable of undergoing cross-linking, and (iii) dissolved in said aqueous dispersion a water-soluble acidic phosphate-ion-providing compound in an amount sufficient to acidify said dispersion to a pH of at least about 3; any of said molybdenum trioxide and molybdate being present in the range of from 0.5 to 3.3 parts of molybdenum compound to from 2 to 1 part of film-forming resin to leave said integrally continuous covering with said discrete particles dispersed in it, said covering when dry being suitable as a primer coating ready to receive a finish coat of paint or other final organic coating.

2. A composition as claimed in claim 1, wherein the molybdate compound is a polyvalent metal molybdate.

3. A composition as claimed in claim 2, wherein the molybdate is at least one member of the class consisting of zinc molybdate, copper molybdate, cadmium molybdate, manganese molybdate, nickel molybdate, cobalt molybdate, and chromium molybdate.

4. A composition as claimed in claim 3, wherein the molybdate is zinc molybdate.

5. A composition as claimed in claim 3, wherein the molybdate is copper molybdate.

6. A composition as claimed in claim 3, wherein there is a plurality of molybdates.

7. A composition as claimed in claim 6, wherein the molybdates are zinc molybdate and copper molybdate.

8. A composition as claimed in claim 1, wherein the resin is at least one water-dispersible latex.

9. A composition as claimed in claim 8, wherein the water-dispersible latex is at least one member of the class consisting of a polyvinyl acetate latex, an acrylic acid resin latex, a styrene and butadiene latex, and a butyl rubber latex.

10. A composition as claimed in claim 1, in which the resin is at least one polymeric alcohol.

11. A composition as claimed in claim 10, in which the resin is polyvinyl alcohol.

12. A composition as claimed in claim 1, in which the resin is at least one water-dispersible cellulose derivative.

13. A composition as claimed in claim 1, wherein the phosphate ion-providing substance is at least one member of the class consisting of phosphoric acid, an alkali metal dihydrogen phosphate, ammonium dihydrogen phosphate, and a water-soluble alkyl acid phosphate.

14. A composition as claimed in claim 13, wherein the phosphate ion-providing substance is a mixture of phosphoric acid and sodium dihydrogen phosphate and thereby manifests improved storage.

15. A composition as claimed in claim 13, wherein the resin is at least one water-dispersible latex.

16. A composition as claimed in claim 13, wherein the resin is at least one polymeric alcohol.

17. A composition as claimed in claim 13, wherein the resin is at least one water-dispersible cellulose derivative.

18. The method of preparing an acidic activated film-forming aqueous wash-primer composition as claimed in claim 1, whch method comprises (a) preparing a reactive pigment-resin dispersion by admixing discrete particles of at least one of finely divided molybdenum trioxide and the sparingly soluble in water polyvalent metal molybdates in a dispersion of stably water-dispersible film-forming reactive resin capable of undergoing cross-linking, in an aqueous medium, and in such relative amounts to provide said molybdenum compound and resin with their respective ranges recited in claim 1; (b) preparing an activator solution by dissolving in water a water-soluble substance which provides phosphate ions in said solution and imparts acidity to it, and (c) admixing said pigment-resin dispersion and activator solution in such ratio for the resulting dispersion to be acid with a pH of at least about 3 and to form a ready-to-use heterogeneous-phased aqueous dispersion containing dispersed discrete particles of said molybdate compound and effective when applied to a metal surface to react with and form on it a corrosion resistant complex reaction coating under an integral adherent continuous organic film-covering of said resin.

19. The method as claimed in claim 18, wherein the molybdate compound is at least one polyvalent metal molybdate.

20. The method as claimed in claim 19, wherein the metal molybdate is at least zinc molybdate.

21. The method as claimed in claim 19, wherein there is a mixture of zinc molybdate and copper molybdate.

22. The method as claimed in claim 19, wherein the resin is at least one water-dispersible latex.

23. The method as claimed in claim 19, wherein the resin is at least one polymeric alcohol.

24. The method as claimed in claim 19, wherein the resin is at least one water-dispersible cellulose derivative.

25. The method of enhancing the integral corrosion resistance of an exposed metal surface lacking prior corrosion resistance enhancement treatment and ordinarily subject to oxidation corrosion when exposed to an oxidation-corrosion-inducing atmosphere, and simultaneously covering it with a primer coat suitable for receiving a finish coat of paint or other finish coat, which method comprises (a) applying over said surface an acidic activated film-forming composition as claimed in claim 1, and (b) drying the applied coating, whereby said applied composition reacts with said metal surface and gives it (i) an integral complex conversion coating containing the principal metal content of said basis surface together with molybdenum and phosphorus from said applied composition, as well as any polyvalent metal which is the cation of any metal molybdate thereof, and (ii) simultaneously leaves said conversion coating integrally adherently covered with an exposed continuous covering of said film-forming resin with discrete particles of said molybdate compound dispersed in it, said covering then being suitable as said primer coating.

26. The method of enhancing corrosion resistance as claimed in claim 25, wherein the molybdate compound is at least one polyvalent metal molybdate.

27. The method as claimed in claim 26, wherein the molybdate is zinc molybdate.

28. The method as claimed in claim 26, wherein the molybdate is both zinc molybdate and copper molybdate, and the corrosion resistance is further enhanced than with the equivalent amount of zinc molybdate alone.

29. The method as claimed in claim 26, wherein the water-dispersible latex is at least one member of the class consisting of a polyvinyl acetate latex, an acrylic acid resin latex, a styrene and butadiene latex, and a butyl rubber latex.

30. The method as claimed in claim 26, wherein the resin is polyvinyl alcohol.

31. The method as claimed in claim 26, wherein the phosphate-ion-producing substance is a mixture of phosphoric acid and sodium dihydrogen phosphate.

References Cited

UNITED STATES PATENTS

| | | | |
|---|---|---|---|
| 2,811,456 | 10/1957 | Coleman et al. | 148—6.15 X |
| 3,136,663 | 6/1964 | McDonald | 148—6.15 |
| 3,272,663 | 9/1966 | Kronstein | 148—6.15 X |

RALPH S. KENDALL, Primary Examiner

U.S. Cl. X.R.

148—6.16